(12) United States Patent
Wang

(10) Patent No.: US 11,869,100 B2
(45) Date of Patent: Jan. 9, 2024

(54) DATA CONSOLIDATION ANALYSIS SYSTEM AND DATA CONSOLIDATION ANALYSIS METHOD

(71) Applicant: CHANGXIN MEMORY TECHNOLOGIES, INC., Hefei (CN)

(72) Inventor: Po-Hao Wang, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 145 days.

(21) Appl. No.: 17/452,632

(22) Filed: Oct. 28, 2021

(65) Prior Publication Data

US 2022/0092706 A1    Mar. 24, 2022

Related U.S. Application Data

(63) Continuation of application No. PCT/CN2021/103803, filed on Jun. 30, 2021.

(30) Foreign Application Priority Data

Sep. 23, 2020   (CN) .......................... 202011012792.6

(51) Int. Cl.
   *G06Q 50/04*    (2012.01)
   *G06Q 10/0633*  (2023.01)

(52) U.S. Cl.
   CPC ......... *G06Q 50/04* (2013.01); *G06Q 10/0633* (2013.01)

(58) Field of Classification Search
   CPC .......................................... G06Q 10/00–50/00
   (Continued)

(56) References Cited

U.S. PATENT DOCUMENTS

| 6,873,878 B2 * | 3/2005 | Liu | .................. | G05B 19/41865 700/111 |
| 2003/0187535 A1 * | 10/2003 | Liu | .................. | G05B 19/41865 700/111 |

(Continued)

FOREIGN PATENT DOCUMENTS

| CN | 1773667 A | 5/2006 |
| CN | 101978389 A | 2/2011 |

(Continued)

OTHER PUBLICATIONS

International Search Report as cited in PCT/CN2021/103803 dated Sep. 30, 2021, 10 pages.

*Primary Examiner* — Alan S Miller
(74) *Attorney, Agent, or Firm* — Cooper Legal Group, LLC

(57) ABSTRACT

The embodiments of the present application provide a data consolidation analysis method and a data consolidation analysis method. The data consolidation analysis system includes: a first acquiring module, which is configured to acquire machine event data; a second acquiring module, which is configured to acquire production event data; a data processing module, which is connected with the first acquiring module and the second acquiring module and configured to acquire a raw process time of each product and a production capacity index of each batch of products; and an analyzing module, which is connected with the data processing module and configured to acquire a first matching relationship between the production capacity index of each batch of products and the raw process time of each product.

17 Claims, 5 Drawing Sheets

(58) Field of Classification Search
USPC .............................................. 705/7.11–7.42
See application file for complete search history.

(56) References Cited

U.S. PATENT DOCUMENTS

| | | | |
|---|---|---|---|
| 2006/0116784 A1* | 6/2006 | Chiu ................ | G05B 19/41875 |
| | | | 700/121 |
| 2010/0023151 A1* | 1/2010 | Shieh ............... | G05B 19/41885 |
| | | | 700/121 |
| 2015/0316909 A1* | 11/2015 | Govindaraj .......... | G05B 19/048 |
| | | | 700/19 |
| 2017/0032016 A1* | 2/2017 | Zinner ................. | G06F 16/283 |
| 2018/0101814 A1* | 4/2018 | Nadella ................ | G06Q 10/087 |

FOREIGN PATENT DOCUMENTS

| | | |
|---|---|---|
| CN | 103034215 A | 4/2013 |
| CN | 101978389 B | 7/2014 |
| CN | 103034215 B | 8/2015 |
| TW | 533468 B | 5/2003 |
| TW | 200928726 A | 7/2009 |

* cited by examiner

DATA CONSOLIDATION ANALYSIS SYSTEM AND DATA CONSOLIDATION ANALYSIS METHOD

CROSS-REFERENCE TO RELATED APPLICATIONS

This application is a continuation application of International Patent Application No. PCT/CN2021/103803, filed Jun. 30, 2021, which claims priority to Chinese Patent Application No. 202011012792.6, filed with the Chinese Patent Office on Sep. 23, 2020 and entitled "DATA CONSOLIDATION ANALYSIS SYSTEM AND DATA CONSOLIDATION ANALYSIS METHOD". International Patent Application No. PCT/CN2021/103803 and Chinese Patent Application No. 202011012792.6 are incorporated herein by reference in their entireties.

TECHNICAL FIELD

The present application relates to the field of semiconductors, and in particular to a data consolidation analysis system and a data consolidation analysis method.

BACKGROUND

With the growing expansion of production scale in the manufacturing industry, a huge amount of production data has been generated. In view of efficiencies, data processing is usually not carried out in the traditional approaches, so engineers are typically required to produce reports manually by themselves later, which leads to a low analysis efficiency. At present, although some production machines are equipped with supporting production data analysis reports, the reports provided are too simple to meet the requirements for a machine debugging analysis by engineers.

Therefore, there exists an urgent need for a report system, which can perform a customized analysis on the production process data of the machines and improve the efficiency by consolidating related production data, so as to allow for the engineers to complete a quick and efficient analysis without any downtime and further increase the utilization rate of the machines.

SUMMARY

To solve the problem described above, provided in the present application is a data consolidation analysis system, which includes: a first acquiring module, which is configured to acquire machine event data; a second acquiring module, which is configured to acquire production event data; a data processing module, which is connected with the first acquiring module and the second acquiring module and configured to acquire a raw process time of each product and a production capacity index of each batch of products according to the machine event data and the production event data; and an analyzing module, which is connected with the data processing module, and configured to receive the raw process time of each product and the production capacity index of each batch of products imported by the data processing module and acquire a first matching relationship between the production capacity index of each batch of products and the raw process time of each product.

Also provided in the embodiments of the present application is a data consolidation analysis method, characterized by including: acquiring machine event data and production event data; acquiring a raw process time of each product and a production capacity index of each batch of products according to the machine event data and the production event data; and acquiring a first matching relationship between the production capacity index of each batch of products and the raw process time of each product.

BRIEF DESCRIPTION OF DRAWINGS

One or more embodiments will be exemplarily illustrated with reference to the figures in the accompanying drawings corresponding thereto. These exemplary illustrations do not constitute a limitation to the embodiments. Unless otherwise specifically stated, the figures in the accompanying drawings do not constitute a scale limitation.

DESCRIPTION OF EMBODIMENTS

As can be clearly seen from the Background, there exists a low efficiency issue in production data analysis.

Upon analysis, we have found the following main reasons: production data analysis reports that are coordinated with the current production machines are too simple to cope with the huge amount of data brought by production capacity improvements; it is impossible to rapidly compare various types of data due to low degree of data consolidation; and the raw production conditions cannot be traced back through data since data correlation is relatively low.

To solve the above problem, the embodiments of the present application provide a data consolidation analysis system and a data consolidation analysis method. The analyzing module in the data consolidation analysis system is able to acquire the first matching relationship between the production capacity index of each batch of products and the raw process time of each product. Therefore, a rapid global analysis can be carried out on production conditions through the production capacity index of each batch of products. With the help of the first matching relationship, the matched raw process time can be quickly found, allowing for an in-depth analysis for the specific production conditions. As a result, the efficiency and accuracy of the data analysis process are improved.

For a better clarity of the objects, the technical solutions, and the advantages of the embodiments of the present application, a detailed description of the embodiments of the present application is given below in combination with the accompanying drawings. However, the ordinary skilled in the art can understand that many technical details are provided in the embodiments of the present application so as to make readers better understand the present application. However, even if these technical details are not provided and based on a variety of variations and modifications of the following embodiments, the technical solutions sought for protection in the present application can also be realized.

Figure 1:
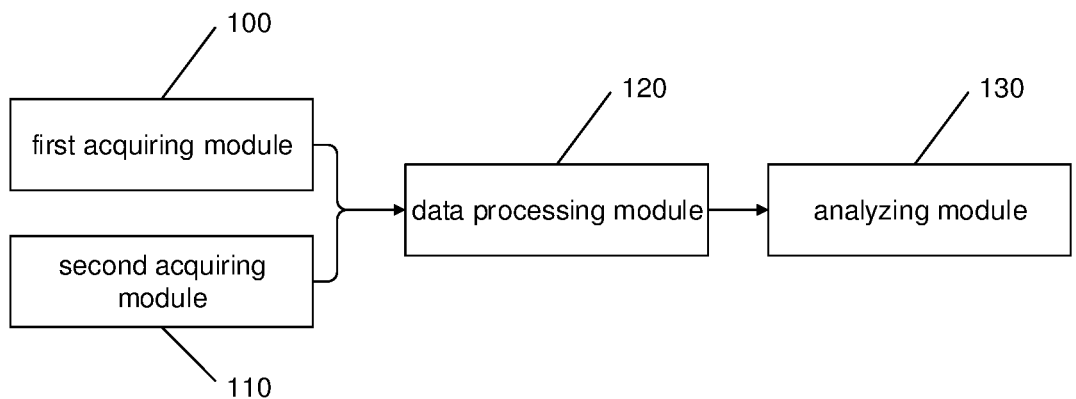
FIG. 1 and FIG. 2 are schematic diagrams of a data consolidation analysis system according to the first embodiment.
Figure 2:
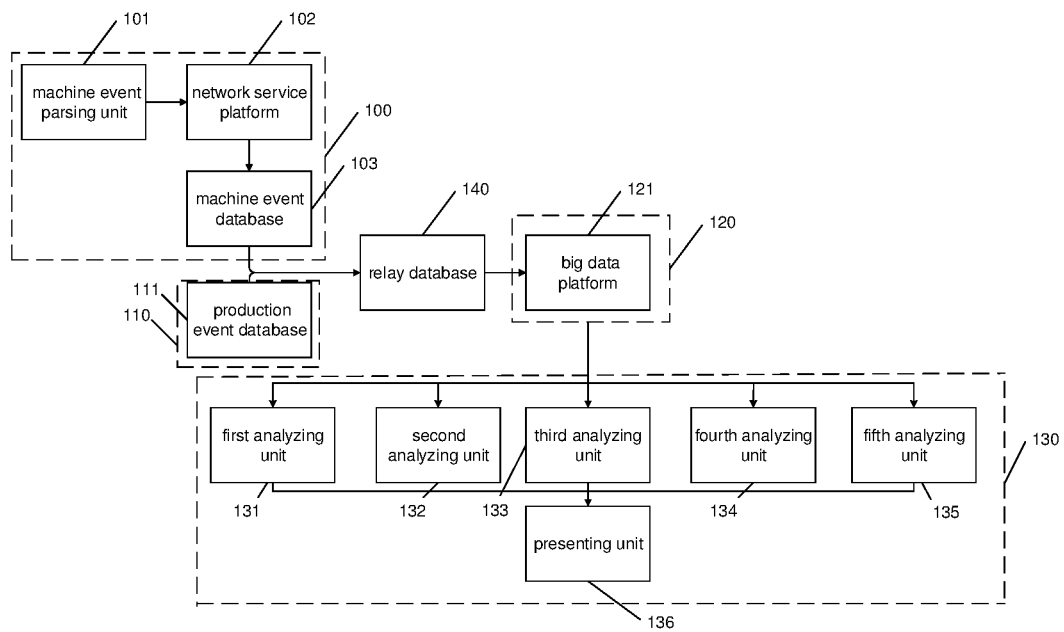

A first embodiment of the present application provides a data consolidation analysis system. FIG. 1 to FIG. 2 are schematic diagrams of the data consolidation analysis system according to this embodiment.

Referring to FIG. 1, in this embodiment, the data consolidation analysis system includes: a first acquiring module 100, which is configured to acquire machine event data; a second acquiring module 110, which is configured to acquire production event data; a data processing module 120, which is connected with the first acquiring module 100 and the second acquiring module 110 and configured to acquire a raw process time of each product and a production capacity index of each batch of products according to the machine event data and the production event data; and an analyzing module 130, which is connected with the data processing module 120, and configured to receive the raw process time of each product and the production capacity index of each batch of products imported by the data processing module 120 and acquire a first matching relationship between the production capacity index of each batch of products and the raw process time of each product.

A detailed description will be given below in conjunction with the accompanying drawings.

Referring to FIG. 2, the first acquiring module 100 is configured to acquire the machine event data. The machine event data includes data such as products, process locations, occupancy flags, process time, machine control commands, etc.

The first acquiring module 100 includes a machine event parsing unit 101, a network service platform 102 and a machine event database 103.

The machine event parsing unit 101 is configured to parse raw machine event information, generate the machine event data, and upload the machine event data to the network service platform 102. In this embodiment, the machine event parsing unit 101 is machine event parsing software installed on various machines, and the machine event parsing software, based on the production and operation requirements, carries out automatic information uploading and downloading and generate the machine event data. The machine event data keeps a record of raw conditions during the production process, and during a machine debugging analysis, an in-depth exploration into the issues and improvements thereof can be achieved by means of the machine event data.

The network service platform 102 is configured to exchange or consolidate the machine event data of a plurality of machines.

The machine event database 103 is configured to acquire or save the data imported by the network service platform 102. The machine event database 103 may perform operations on the machine event data, such as addition, update, truncation, etc.

The second acquiring module 110 includes a production event database 111 configured to acquire and save the production event data. The production event data includes related data such as production formula, raw materials for product, etc.

A relay database 140 connects the data processing module 120 with the first acquiring module 100 and the second acquiring module 110. Specifically, the machine event database 103 and the production event database 111 are connected with the relay database 140.

The relay database 140 is configured to summarize the machine event data and the production event data, and import the summarized data to the data processing module 120. The relay database 140 facilitates an improvement in the stability and flexibility of the data consolidation analysis system, and can summarize or recover the data rapidly in order to prevent data loss.

It is to be understood that in other embodiments, the first acquiring module and the second acquiring module may also be directly connected with the data processing module. Specifically, the machine event database of the first acquiring module and the production event database of the second acquiring module are connected with the relay database.

The data processing module 120 includes a big data platform that is capable of massive data storage, calculations, and uninterrupted, real-time data calculations. The big data platform includes: Hive in Hadoop, HDFS software, and Rapidminer software. The big data platform can process a huge amount of data rapidly, and the processing efficiency of the data consolidation analysis system is not compromised even if the production capacity is continuously increased.

In other embodiments, the data processing module may further include an application and a database.

In particular, the big data platform calculates a net process time of each product according to the production event data and the machine event data, calculates the raw process time according to the net process time, and calculates the production capacity index according to the raw process time.

For example, during the course of wafer production, the net process time for wafers refers to the difference between a production start time and a production end time in one production process. Raw Process Time (RPT) refers to the difference between the production end time in the last production process and the production start time in the first production process, for wafers. Wafer Per Hour (WPH) refers to the number of wafers produced per hour.

The production capacity index is calculated according to the following equation:

$$WPH = \frac{\sum_{i=1}^{n} \text{MOVE}_i}{\sum_{i=1}^{n} \text{Production Time}_i},$$

where WPH refers to the production capacity index, MOVE refers to the number of products, Production Time refers to the net process time, i refers to the ith process, and $\Sigma_{i=1}^{n}$ Production Time$_i$ refers to the raw process time, i.e., RPT.

The big data platform also correlates the machine event data with the production event data, mainly including correlations of the machine control commands with the production formula data.

The analyzing module 130 includes: a first analyzing unit 131, which is configured to acquire the first matching relationship. That is, the first analyzing unit 131 matches the production capacity index of each batch of products with the raw process time of each product. Hence, through the production capacity index of each batch of products, the raw process time of each product corresponding thereto can be rapidly attained.

The analyzing module 130 may further include: a second analyzing unit 132, which is configured to acquire a second matching relationship between the raw process time of each product and the machine event data and the production event data. That is, the second analyzing unit 132 matches the raw process time of each product with the machine event data and the production event data. Hence, through the raw process time of each product, the machine event data and the production event data corresponding thereto can be rapidly attained.

As such, with the first analyzing unit 131 and the second analyzing unit 132 combined, all the data in the process of data consolidation can be matched. Through the production capacity index of each batch of products, the machine event data and the production event data corresponding thereto can be rapidly attained. There are stronger correlations among the various types of data, and the analysis becomes more efficient and comprehensive.

The analyzing module 130 may further include: a third analyzing unit 133, which is configured to analyze the production capacity index of each batch of products of at least one machine provided by the data processing module 120, and the raw process time matched with the production capacity index. That is, the third analyzing unit 133 can analyze, among the production capacity indexes of all the batches of products, the production capacity index of each batch of products of one of the machines according to engineer instructions; or, analyze the production capacity index of each batch of products of a plurality of machines, and the raw process time matched with the production capacity index of a plurality of machines.

Further, the third analyzing unit 133 is further configured to analyze the production event data and the machine event data matched with the raw process time of one machine, or analyze the production event data and the machine event data matched with the raw process time of a plurality of machines.

For example, the third analyzing unit 133 may analyze the production conditions of one machine in a particular production process, or analyze the production conditions of different machines in the same production process, or analyze the production conditions of different machines in some production processes.

Therefore, the third analyzing unit 133 is capable of analyzing, according to the engineer instructions, the production conditions of one or a plurality of machines. As such, the analysis inside the machine or between the machines can be done without any downtime, and it is easier to pinpoint faulty machines through the comparison of the production conditions of the plurality of machines, such that debugging analysis is completed and the utilization rate of the machines is improved.

The analyzing module 130 may further include: a fourth analyzing unit 134, which is configured to analyze the production capacity index of each batch of products within a specified production capacity index range provided by the data processing module 120, and the raw process time matched with the production capacity index. That is, the fourth analyzing unit 134 can analyze, among the production capacity indexes of all the batches of products, the production capacity index of each batch of products within the specified production capacity index range as well as the raw process time matched therewith, according to the engineer instructions. For example, the specified production capacity index range can be either a high production capacity index range or a low production capacity index range.

Further, the fourth analyzing unit 134 is further configured to analyze the production event data and the machine event data matched with the raw process time.

Therefore, according to the engineer instructions, the fourth analyzing unit 134 is capable of rapidly analyzing the production conditions within the specified production capacity index range. For example, by a comparative analysis of the production conditions of the low production capacity index range and the high production capacity index range, it is easier to enhance the analysis efficiency and accuracy and the purpose of perfecting production procedures is achieved accordingly.

The analyzing module 130 may further include: a fifth analyzing unit 135, which is configured to analyze the production capacity index of each batch of products under a specified production formula provided by the data processing module 120, and the raw process time matched with the production capacity index. That is, the fifth analyzing unit 135 can analyze, among the production capacity indexes of all the batches of products, the production capacity index of each batch of products under the specified production formula as well as the raw process time matched therewith, according to the engineer instructions.

Further, the fifth analyzing unit 135 is further configured to analyze the production event data and the machine event data matched with the raw process time.

Therefore, according to the engineer instructions, the fifth analyzing unit 135 is capable of rapidly analyzing the production conditions under the specified production formula, i.e., the fifth analyzing unit 135 is capable of consolidating the production formula with machine parameters. By comparing the production conditions under different production formulae, the production formulae can be improved and the production efficiency and quality of the products can be increased.

It is to be understood that in other embodiments, the third analyzing unit, the fourth analyzing unit and the fifth analyzing unit may be absent as well.

The analyzing module 130 includes a presenting unit 136, which is configured to visually present the raw process time of each product and the production capacity index of each batch of products. The presenting unit 136 may be a Spotfire platform.

In particular, the presenting unit 136 is connected with the first analyzing unit 131, the second analyzing unit 132, the third analyzing unit 133, the fourth analyzing unit 134 and the fifth analyzing unit 135, and visually presents the results of analysis. As a result, there is no need for an engineer to produce reports manually, thereby achieving the purposes of saving time and improving working efficiency.

The production capacity index and the raw process time are presented in a report system. The production capacity index is presented in one report and the raw process time is presented in another report. The production capacity index report is linked with the raw process time report. For example, the production capacity index of a particular batch of products is clicked to jump to the raw process time report matched with the production capacity index of this batch of products. In the raw process time report, the raw process time of each product in this batch of products is presented. As such, examination can be realized only with one report system, making the analysis more convenient and efficient. The raw process time of the same batch of products is presented in the same color, such that the production capacity index of each batch of products can be rapidly compared. Further, the presenting unit 136 may also present, in the same color, the raw process time of each batch of products within the specified production capacity index range, or the raw process time of each batch of products under the specified production formula, or the raw process time of each batch of products of the same machine, according to the engineer instructions.

Further, the presenting unit 136 may display not only the raw production time of each product on the machine, but also the production time at particular locations of the machine, and the consolidated data of the production time at various locations inside the machine. In this way, manual matching by the engineers can be avoided.

In conclusion, with the help of the first acquiring module 100, the second acquiring module 110, the data processing module 120 and the analyzing module 130, the data consolidation analysis system according to this embodiment can address the problem that the production process data of the production machines is widely dispersed and that the operation for massive data is time-consuming, and offer a swift, flexible and targeted development for the subsequent data analysis.

Figure 3:
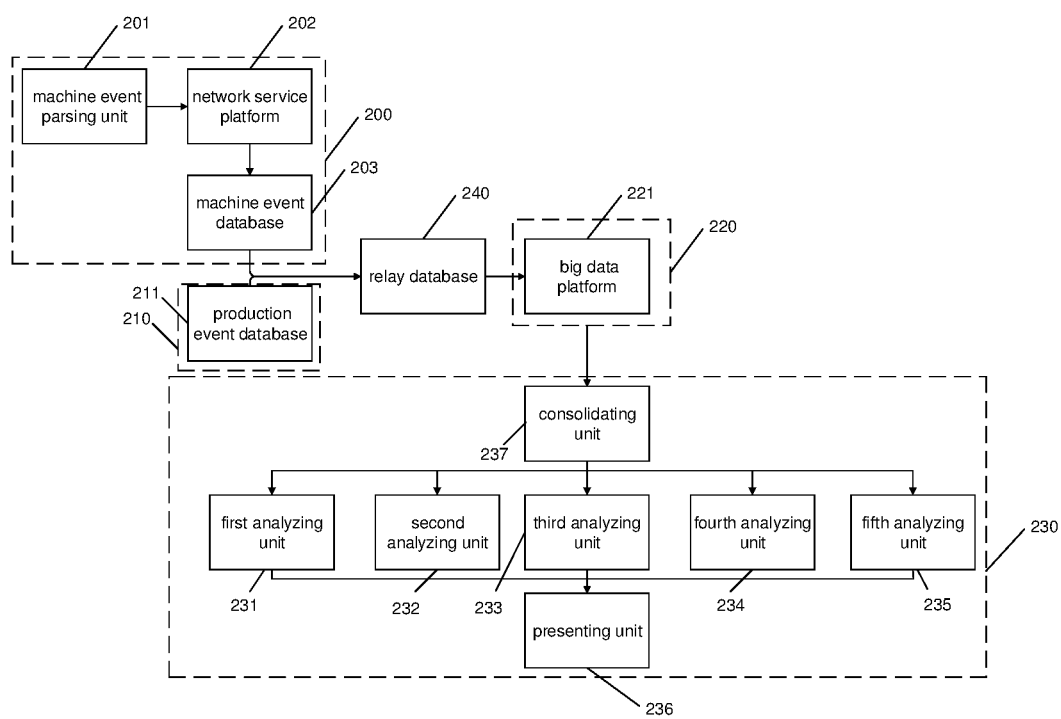
FIG. 3 is a schematic diagram of a data consolidation analysis system according to the second embodiment.

A second embodiment of the present application provides a data consolidation analysis system. FIG. 3 is a schematic diagram of the data consolidation analysis system according to this embodiment. With reference to FIG. 3, the data consolidation analysis system of this embodiment is substantially the same as the data consolidation analysis system of the first embodiment, with the main difference that: in this embodiment the data processing module 220 is further configured to: calculate a product idle time and a product wait time according to the production event data and the machine event data; the analyzing module 230 further includes a consolidating unit 237, which is configured to consolidate the raw process time of each product, the product idle time and the product wait time; and the presenting unit 236 is further configured to visually present the raw process time of each product, the product idle time and the product wait time.

A detailed description will be given below with reference to the accompanying drawings. Reference is made to the first embodiment as this embodiment is the same as or similar to the first embodiment, and a description thereof is not given here.

The data processing module 220 is further configured to calculate the product idle time and the product wait time according to the production event data and the machine event data. Product Idle Time is the difference between the start time of one process and the end time of the previous process. Product Wait Time is the difference between the start time of the first process and the time when the production begins. If only the production time on the machine, i.e., the raw production time, is taken into consideration, it is highly likely to neglect the entire global production situation. Thus, calculating the product idle time and the product wait time can improve the integrity and accuracy of data analysis.

The consolidating unit 237 is configured to consolidate the raw process time of each product, the product idle time and the product wait time. That is, the consolidating unit 237 consolidates the various times during the entire process from the beginning to the ending of the production.

Further, the first analyzing unit 231 is further configured to match the consolidated raw process time, product idle time and product wait time.

The second analyzing unit 232 is further configured to match the consolidated raw process time, product idle time and product wait time with the raw production event data and machine production event data.

The third analyzing unit 233 is further configured to analyze the product idle time and the product wait time of at least one machine.

The fourth analyzing unit 234 is further configured to analyze the product idle time and the product wait time within the specified production capacity index range.

The fifth analyzing unit 235 is further configured to analyze the product idle time and the product wait time under the specified production formula.

The presenting unit 236 is further configured to visually present the raw process time of each product, the product idle time and the product wait time. That is, the presenting unit 236 presents the raw process time of each product, the product idle time and the product wait time in the same report. The presenting unit 236 links the production capacity index with the raw process time, the product idle time and the product wait time. As such, by selecting the production capacity index of a particular batch of products, the page of the report can jump to the report of the raw process time, the product idle time and the product wait time matched with this production capacity index.

To sum up, the data consolidation analysis system of this embodiment can improve the integrity and accuracy of data analysis by calculating, analyzing, and presenting the product idle time and the product wait time.

Figure 4:
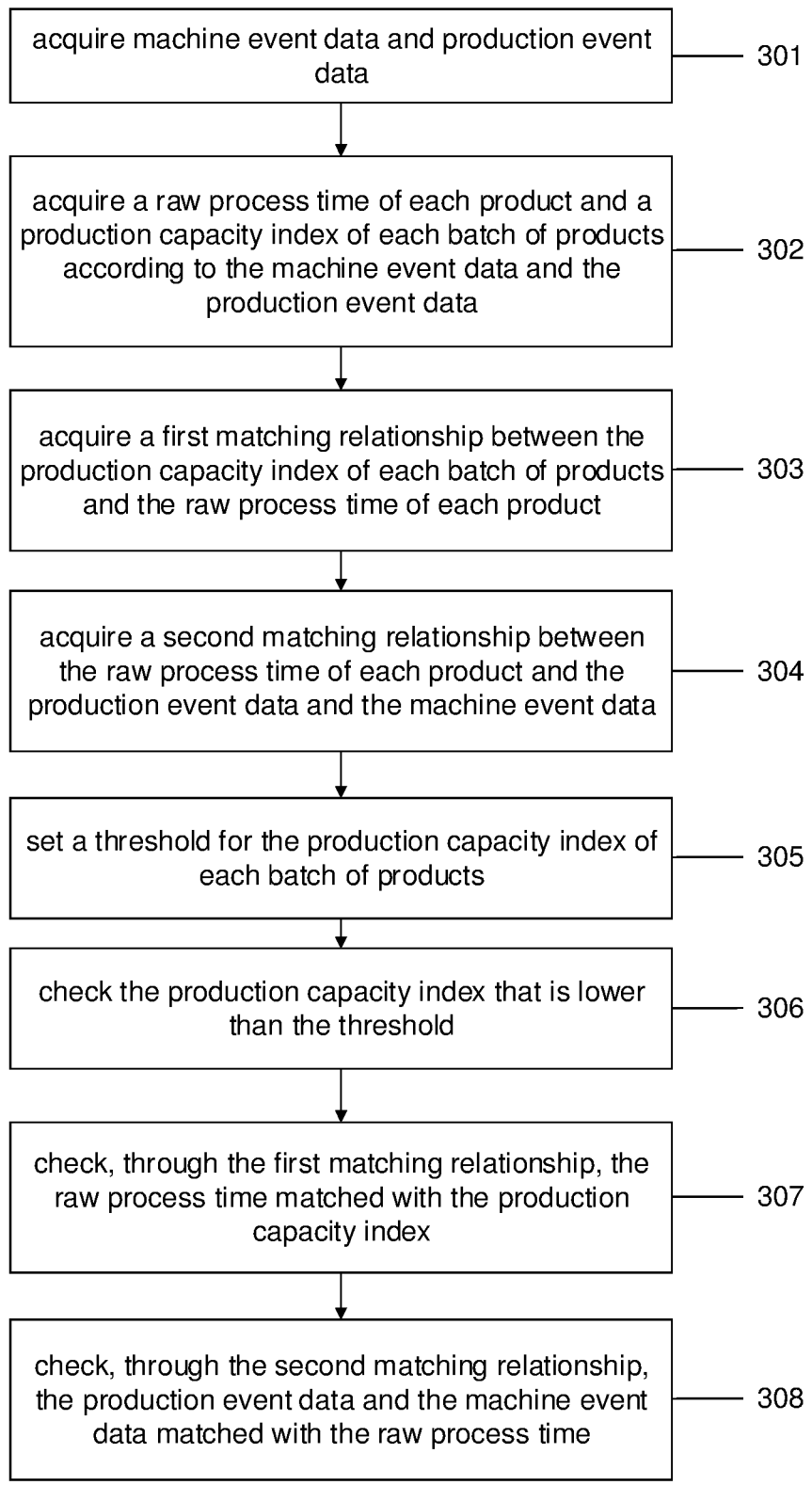
FIG. 4 is a schematic diagram of a data consolidation analysis method according to the third embodiment.

A third embodiment of the present application provides a data consolidation analysis method. The data consolidation analysis method of this embodiment may be implemented with the data consolidation analysis system of the first embodiment or the second embodiment. FIG. 4 is a schematic diagram of the data consolidation analysis method.

A detailed description will be given below with reference to the accompanying drawings.

With reference to FIG. 4, the data consolidation analysis method includes:

S301: acquiring machine event data and production event data.

S302: acquiring a raw process time of each product and a production capacity index of each batch of products according to the machine event data and the production event data.

The machine event data and the production event data are too complex to be analyzed, and thus need to be transformed into the raw process time and the production capacity index. The production capacity index of each batch of products has the best intuitiveness, and by comparing the amounts of shipment during particular periods of time, issues can be directly found. The raw process time is not intuitive enough with respect to the production capacity index, but can still provide a reflection of more detailed production conditions.

S303: acquiring a first matching relationship between the production capacity index of each batch of products and the raw process time of each product.

S304: acquiring a second matching relationship between the raw process time of each product and the production event data and the machine event data.

S305: setting a threshold for the production capacity index of each batch of products.

To increase the analysis efficiency, the various batches of products may be segmented by time, and multiple batches of products within particular periods of time are selected for the setting of the production capacity index threshold.

S306: checking the production capacity index that is lower than the threshold.

The production capacity index that is lower than the threshold is an abnormal production capacity index, which then can be parsed by the engineers.

Figure 5:
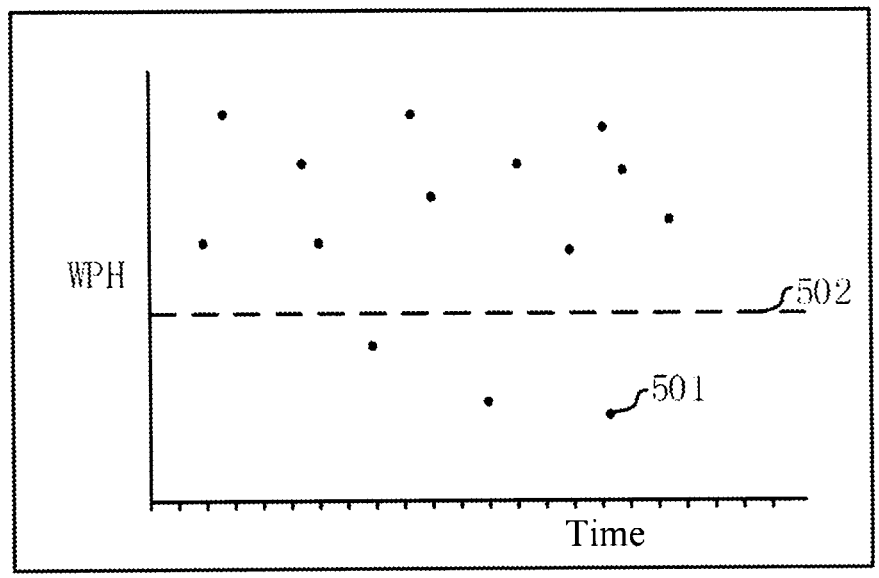
FIG. 5 is a schematic interface diagram of a production capacity index report according to the third embodiment.

With reference to FIG. 5, FIG. 5 is a schematic interface diagram illustrating presentation of the production capacity index in a report, wherein each dot 501 represents each batch of products, and threshold 502 may be a value set by the engineers in advance.

S307: checking, through the first matching relationship, the raw process time matched with the production capacity index.

That is, the abnormal raw process time matched with the abnormal production capacity index is checked.

S308: checking, through the second matching relationship, the production event data and the machine event data matched with the raw process time.

That is, the production event data and the machine event data matched with the abnormal raw process time are checked.

Figure 6A:
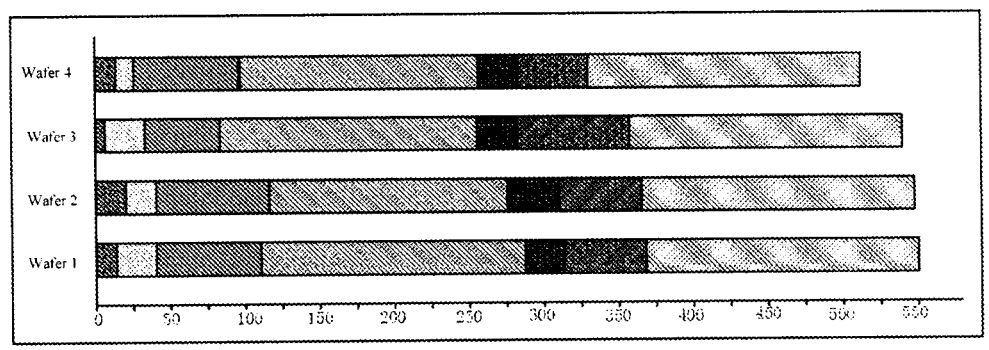
FIG. 6A, FIG. 6B and FIG. 6C are schematic interface diagrams of raw process time reports according to the third embodiment.
Figure 6B:
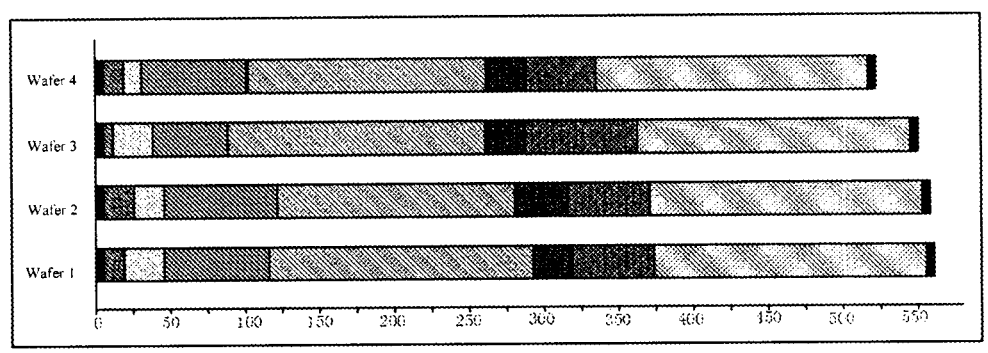
Figure 6C:
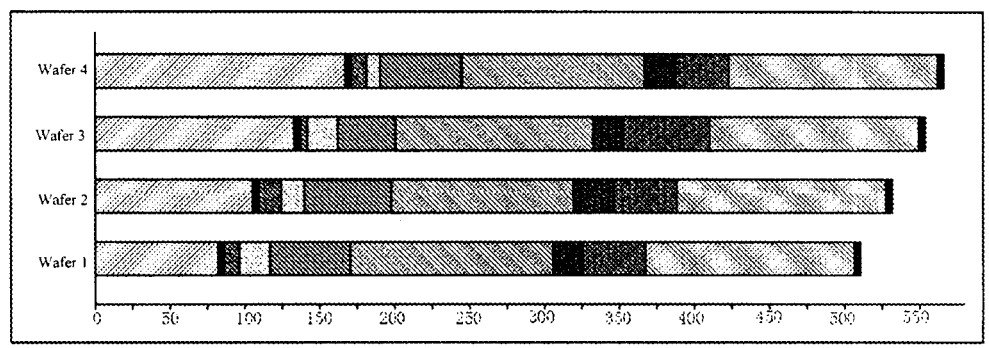

With reference to FIG. 6A, FIG. 6B and FIG. 6C, FIG. 6A is a schematic interface diagram illustrating visual presentation of the raw process time of each product, FIG. 6B is a schematic interface diagram illustrating visual presentation of the raw process time of each product and the product idle time, and FIG. 6C is a schematic interface diagram illustrating visual presentation of the raw process time of each product and the product idle time and the product wait time. When an engineer clicks and selects a dot 501 in FIG. 5, the data consolidation analysis system may acquire the raw process time corresponding to the selected dot 501, and a plurality of products corresponding to this batch of products are visually presented through the report as shown in FIG. 6A, FIG. 6B or FIG. 6C.

In conclusion, the abnormal production capacity indexes are checked, and the production event data and the machine event data corresponding to the abnormal production capacity indexes are found through the first matching relationship and the second matching relationship. As such, raw production conditions can be traced back through data, such that the analysis efficiency is increased and the production process is improved.

Ordinary skilled in the art can understand that the implementations described above are particular embodiments for implementing the present application. In practical uses, various changes in forms and details may be made to the implementations without departing from the spirit and scope of the present application. Any skills in the art may make their own changes and modifications without departing from the spirit and scope of the present application. Therefore, the protection scope of the present application shall be subject to the protection scope of the claims.

What is claimed is:

1. A data consolidation analysis system, comprising a processor and a memory, wherein the processor is configured to execute program instructions stored on the memory to:
   acquire a raw process time of each product and a production capacity index of each batch of products according to the machine event data and the production event data, wherein the raw process time of each product is configured to reflect a specific production condition of the product; and
   receive the raw process time of each product and the production capacity index of each batch of products and acquire a first matching relationship between the production capacity index of each batch of products and the raw process time of each product,
   wherein the processor acquires the raw process time of each product and the production capacity index of each batch of products by:
      calculating a net process time of each product according to the production event data and the machine event data, calculating the raw process time according to the net process time, and calculating the production capacity index according to the raw process time; and
   the production capacity index is calculated according to the following equation:

$$WPH = \frac{\sum_{i=1}^{n} MOVE_i}{\sum_{i=1}^{n} Production\ Time_i}$$

where WPH refers to the production capacity index, MOVE refers to a number of products, Production Time refers to the net process time, i refers to the ith process, and $\Sigma_{i=1}^{n}$ Production Time$_i$ refers to the raw process time,
   wherein the first matching relationship comprises a corresponding relationship between the production capacity index of each batch of products and the raw process time of each product that is used for calculating the production capacity index of the batch of products,
   wherein the machine event data comprises at least one of a product, a process location, an occupancy flag, process time, or a machine control command, and
   wherein the production event data comprises at least one of a production formula or a raw material for production.

2. The data consolidation analysis system according to claim 1, wherein the processor is further configured to execute the program instructions stored on the memory to enable the data consolidation analysis system to visually present the raw process time of each product and the production capacity index of each batch of products.

3. The data consolidation analysis system according to claim 2, wherein the processor is further configured to calculate a product idle time and a product wait time according to the production event data and the machine event data, consolidate the raw process time of each product, the product idle time and the product wait time; and the processor is further configured to execute the program instructions stored on the memory to enable the data consolidation analysis system to visually present the raw process time of each product, the product idle time and the product wait time,
   wherein the product idle time is a difference between start time of one process and end time of a previous process, and
   the product wait time is a difference between start time of a first process and time when production begins.

4. The data consolidation analysis system according to claim 1, wherein the processor is further configured to:
   acquire a second matching relationship between the raw process time of each product and the machine event data and the production event data,
   wherein the second matching relationship comprises a corresponding relationship between the production event data and the machine event data that are used for calculating the raw process time of each product and the raw process time of the product.

5. The data consolidation analysis system according to claim 4, wherein the processor is further configured to analyze the production capacity index of each batch of products of at least one machine, and the raw process time matched with the production capacity index.

6. The data consolidation analysis system according to claim 4, wherein the processor is further configured to analyze the production capacity index of each batch of products within a specified production capacity index range, and the raw process time matched with the production capacity index.

7. The data consolidation analysis system according to claim 4, wherein the processor is further configured to analyze the production capacity index of each batch of products under a specified production formula, and the raw process time matched with the production capacity index.

8. The data consolidation analysis system according to claim 1, wherein the processor is further configured to analyze the production capacity index of each batch of products of at least one machine, and the raw process time matched with the production capacity index.

9. The data consolidation analysis system according to claim 1, wherein the processor is further configured to analyze the production capacity index of each batch of products within a specified production capacity index range, and the raw process time matched with the production capacity index.

10. The data consolidation analysis system according to claim 1, wherein the processor is further configured to analyze the production capacity index of each batch of products under a specified production formula, and the raw process time matched with the production capacity index.

11. The data consolidation analysis system according to claim 1, further comprising: a relay database, the relay database being configured to summarize the machine event data and the production event data.

12. The data consolidation analysis system according to claim 11, wherein the processor is further configured to parse raw machine event information, generate the machine event data, and upload the machine event data to a network service platform; wherein the processor is further configured to execute the program instructions stored on the memory to enable the data consolidation analysis system to exchange or consolidate the machine event data of a plurality of machines, and acquire or save the data imported by the network service platform.

13. The data consolidation analysis system according to claim 11, wherein the processor is further configured to execute the program instructions stored on the memory to enable the data consolidation analysis system to save the production event data.

14. A data consolidation analysis method, comprising:
acquiring machine event data and production event data;
acquiring a raw process time of each product and a production capacity index of each batch of products according to the machine event data and the production event data, wherein the raw process time of each product is configured to reflect a specific production condition of the product; and
acquiring a first matching relationship between the production capacity index of each batch of products and the raw process time of each product,
wherein acquiring the raw process time of each product and the production capacity index of each batch of products comprises:
calculating a net process time of each product according to the production event data and the machine event data, calculating the raw process time according to the net process time, and calculating the production capacity index according to the raw process time; and
the production capacity index is calculated according to the following equation:

$$WPH = \frac{\sum_{i=1}^{n} \text{MOVE}_i}{\sum_{i=1}^{n} \text{Production Time}_i}$$

where WPH refers to the production capacity index, MOVE refers to a number of products, Production Time refers to the net process time, i refers to the ith process, and $\Sigma_{i=1}^{n}$ Production Time$_i$ refers to the raw process time,
wherein the first matching relationship comprises a corresponding relationship between the production capacity index of each batch of products and the raw process time of each product that is used for calculating the production capacity index of the batch of products,
wherein the machine event data comprises at least one of a product, a process location, an occupancy flag, process time, or a machine control command, and
wherein the production event data comprises at least one of a production formula or a raw material for production.

15. The data consolidation analysis method according to claim 14, further comprising: setting a threshold for the production capacity index of each batch of products; determining the production capacity index that is lower than the threshold, and determining, through the first matching relationship, the raw process time matched with the production capacity index that is lower than the threshold.

16. The data consolidation analysis method according to claim 15, further comprising, after acquiring the raw process time of each product and the production capacity index of each batch of products: acquiring a second matching relationship between the raw process time of each product and the production event data and the machine event data,
wherein the second matching relationship comprises a corresponding relationship between the production event data and the machine event data that are used for calculating the raw process time of each product and the raw process time of the product.

17. The data consolidation analysis method according to claim 16, further comprising, after determining the raw process time matched with the production capacity index: determining, through the second matching relationship, the production event data and the machine event data matched with the raw process time.

* * * * *